US011122060B2

(12) United States Patent
Jana et al.

(10) Patent No.: US 11,122,060 B2
(45) Date of Patent: Sep. 14, 2021

(54) DETECTION OF SECURITY THREATS IN A MESH NETWORK

(71) Applicant: QUALCOMM Incorporated, San Diego, CA (US)

(72) Inventors: Sourabh Jana, Bangalore (IN); Chirag Manojkumar Kharvar, Bangalore (IN); Ravi Shekhar, Thubarahalli (IN); Ravi Kiran Bamidi, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 304 days.

(21) Appl. No.: 16/203,572

(22) Filed: Nov. 28, 2018

(65) Prior Publication Data

US 2020/0169572 A1 May 28, 2020

(51) Int. Cl.
| | |
|---|---|
| H04L 29/06 | (2006.01) |
| H04W 4/80 | (2018.01) |
| H04W 12/06 | (2021.01) |
| H04W 24/08 | (2009.01) |
| H04W 12/041 | (2021.01) |
| H04W 12/0471 | (2021.01) |
| H04W 84/18 | (2009.01) |

(52) U.S. Cl.
CPC ...... *H04L 63/1416* (2013.01); *H04L 63/1466* (2013.01); *H04W 4/80* (2018.02); *H04W 12/041* (2021.01); *H04W 12/0471* (2021.01); *H04W 12/06* (2013.01); *H04W 24/08* (2013.01); *H04W 84/18* (2013.01)

(58) Field of Classification Search
CPC ............. H04L 63/1316; H04L 12/0401; H04L 63/1466; H04W 12/04071; H04W 12/06

USPC .......................................................... 726/23
See application file for complete search history.

(56) References Cited

U.S. PATENT DOCUMENTS

| | | | | |
|---|---|---|---|---|
| 6,473,403 | B1 * | 10/2002 | Bare ...................... | H04L 45/12 370/236 |
| 8,806,633 | B2 * | 8/2014 | Shaffer ............... | H04L 63/1441 726/23 |
| 2013/0197955 | A1 * | 8/2013 | Dillon ................ | H04W 40/248 705/7.13 |

(Continued)

OTHER PUBLICATIONS

Adomnicai A., et al., "Hardware Security Threats against Bluetooth Mesh Networks, IEEE Conference on Communications and Network Security (CNS), IEEE, May 30, 2018 (May 30, 2018), pp. 1-9, XP033383983, DOI: 10.1109/CNS.2018.8433184, [retrieved on Aug. 10, 2018], abstract; figures 1, 3.".

(Continued)

*Primary Examiner* — Longbit Chai
(74) *Attorney, Agent, or Firm* — Kevin T. Cheatham

(57) ABSTRACT

Disclosed are techniques for detecting a security threat in a wireless mesh network. In an aspect, a monitoring device in the wireless mesh network detects a first message transmitted by a source node in the wireless mesh network to a destination node in the wireless mesh network via at least one relay node in the wireless mesh network, collects information from the first message as it is transmitted in the wireless mesh network, determines that the first message has been corrupted based on analysis of the information from the first message, and detects the security threat in the wireless mesh network based on the first message being corrupted.

44 Claims, 9 Drawing Sheets

(56) References Cited

U.S. PATENT DOCUMENTS

2018/0234302 A1   8/2018  James et al.

OTHER PUBLICATIONS

International Search Report and Written Opinion—PCT /US2019/ 058500—ISA/EPO—dated Apr. 2, 2020.
Partial International Search Report—PCT/US2019/058500—ISA/ EPO—dated Feb. 27, 2020.
Umang S., et al., "Enhanced Intrusion Detection System for Malicious Node Detection in Ad Hoc Routing Protocols Using Minimal Energy Consumption", IET Communications, vol. 4, No. 17, Nov. 26, 2010 (Nov. 26, 2010), pp. 2084-2094, XP006036864, ISSN: 1751-8636, DOI: 10.1049/IET-COM: 20090616, the whole document.

* cited by examiner

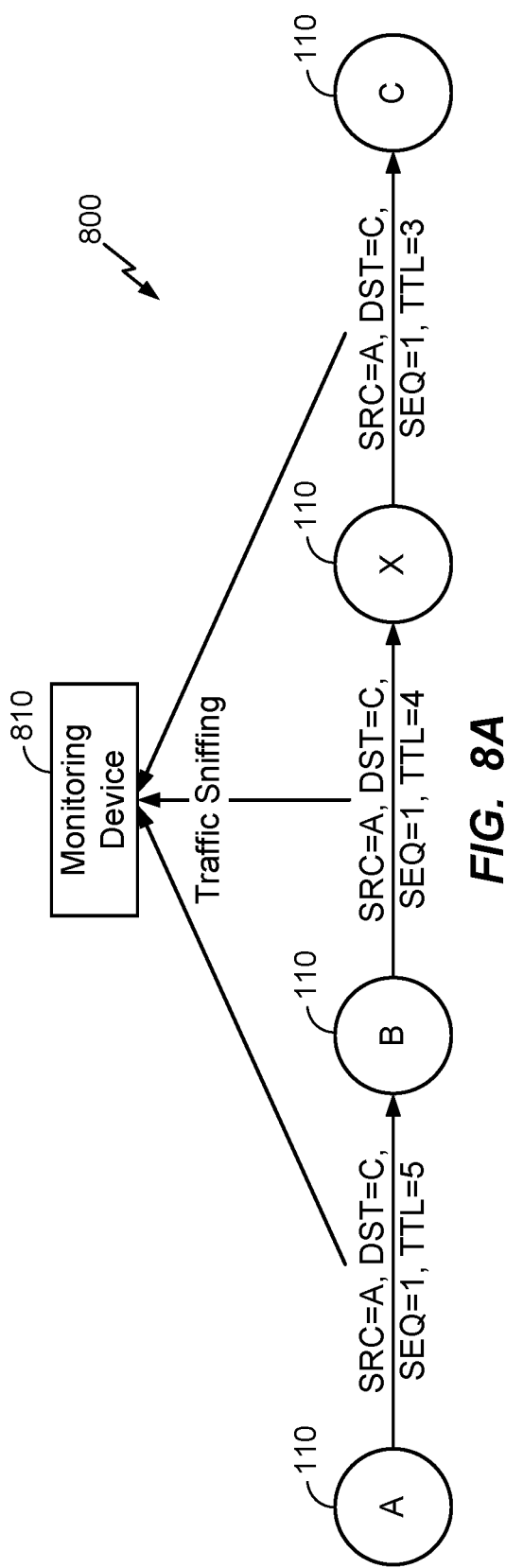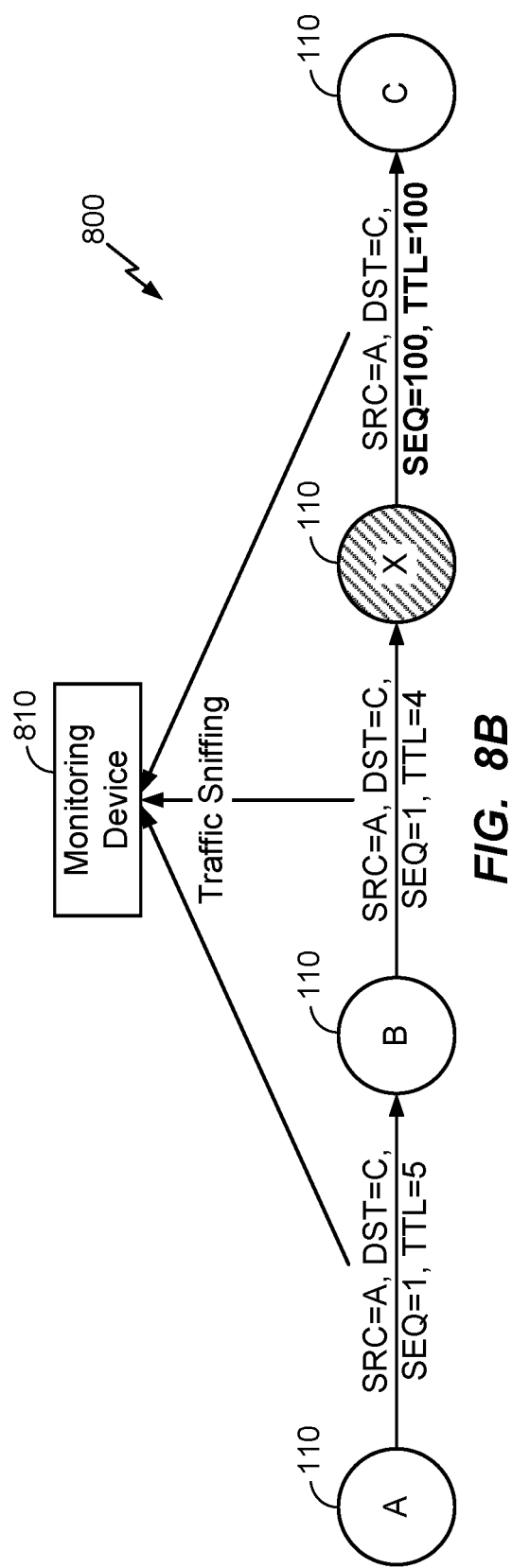

DETECTION OF SECURITY THREATS IN A MESH NETWORK

TECHNICAL FIELD

The various aspects described herein generally relate to wireless communications, and in particular, to detection of security threats in a mesh network.

BACKGROUND

All wireless networking technologies generally have a limited range. However, there are many environments in which devices that are otherwise outside communication range of each other may need to communicate using a reliable low-power wireless technology. For example, the Internet of Things (IoT) is based on the idea that everyday objects, not just computers and computer networks, can be read, recognized, located, addressed, and otherwise controlled via an IoT communications network (e.g., an ad-hoc system or the Internet).

One way to address issues that arise when devices are outside a maximum communication range of each other is to implement a mesh network, which has a topology in which all devices can communicate with each other either directly or indirectly. For example, two devices that are in radio range may communicate directly, whereas communication with devices located outside radio range of each other may be achieved via one or more intermediate "relay" nodes. Mesh networks may therefore offer multiple paths to route a message from a source to a destination, resulting in greater reliability relative to other networks that tend to flow all traffic through a central hub (e.g., a router or gateway).

Accordingly, a wireless mesh network may generally refer to a network in which various devices or "nodes" have the ability to receive and act upon messages in addition to having the ability to repeat or relay the messages to surrounding devices or nodes that are within radio range. The mesh architecture may therefore extend the effective radio range associated with whatever wireless technology is used to convey the messages, and thereby can be used to implement the IoT and other suitable use cases that are built at least in part on wireless communications.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for detecting a security threat in a wireless mesh network includes detecting, by a monitoring device in the wireless mesh network, a first message transmitted by a source node in the wireless mesh network to a destination node in the wireless mesh network via at least one relay node in the wireless mesh network; collecting, by the monitoring device, information from the first message as it is transmitted in the wireless mesh network; determining, by the monitoring device, that the first message has been corrupted based on analysis of the information from the first message; and detecting, by the monitoring device, the security threat in the wireless mesh network based on the first message being corrupted.

In an aspect, an apparatus for detecting a security threat in a wireless mesh network includes at least one processor of a monitoring device in the wireless mesh network configured to: detect a first message transmitted by a source node in the wireless mesh network to a destination node in the wireless mesh network via at least one relay node in the wireless mesh network; collect information from the first message as it is transmitted in the wireless mesh network; determine that the first message has been corrupted based on analysis of the information from the first message; and detect the security threat in the wireless mesh network based on the first message being corrupted.

In an aspect, a non-transitory computer-readable medium storing computer-executable instructions for detecting a security threat in a wireless mesh network includes computer-executable instructions comprising at least one instruction instructing a monitoring device in the wireless mesh network to detect a first message transmitted by a source node in the wireless mesh network to a destination node in the wireless mesh network via at least one relay node in the wireless mesh network; at least one instruction instructing the monitoring device to collect information from the first message as it is transmitted in the wireless mesh network; at least one instruction instructing the monitoring device to determine that the first message has been corrupted based on analysis of the information from the first message; and at least one instruction instructing the monitoring device to detect the security threat in the wireless mesh network based on the first message being corrupted.

In an aspect, an apparatus for detecting a security threat in a wireless mesh network includes means for processing of a monitoring device in the wireless mesh network configured to: detect a first message transmitted by a source node in the wireless mesh network to a destination node in the wireless mesh network via at least one relay node in the wireless mesh network; collect information from the first message as it is transmitted in the wireless mesh network; determine that the first message has been corrupted based on analysis of the information from the first message; and detect the security threat in the wireless mesh network based on the first message being corrupted.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 8A and 8B illustrate a monitoring device sniffing traffic transmitted between all of the nodes in an exemplary mesh network.

DETAILED DESCRIPTION

Figure 1:
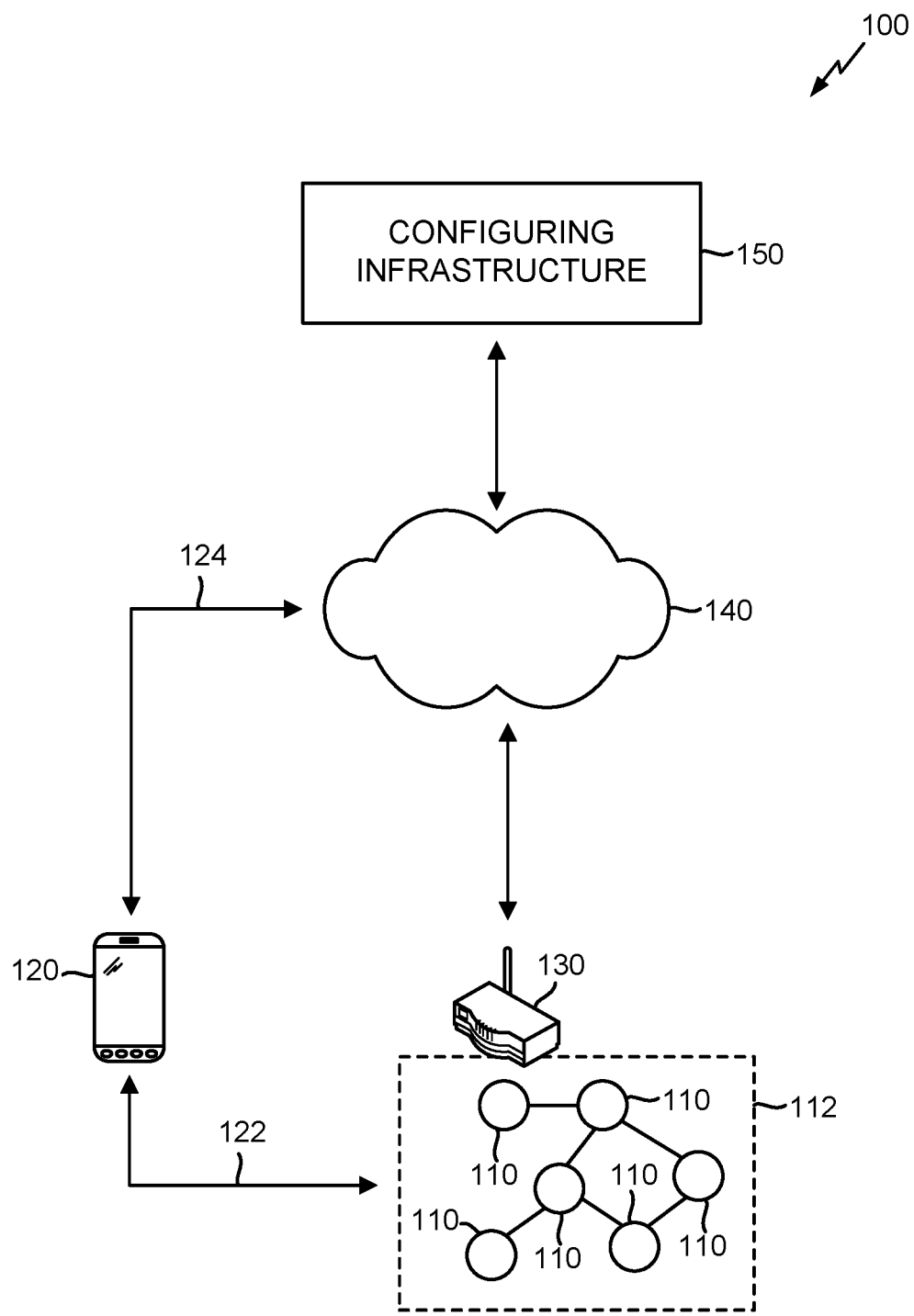
FIG. 1 illustrates an exemplary wireless mesh network in which the various aspects described herein may be suitably implemented.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "node" refers to a mobile or stationary device that is a member of a wireless mesh network. A node may be a cellular "feature" phone, a "smart phone," a personal or mobile multimedia player, a personal data assistant, a laptop computer, a desktop computer, a tablet computer, a wireless gaming controller, an IoT device (e.g., a "smart" thermostat, refrigerator, microwave, speaker system, meter, etc.), and similar devices with a programmable processor, memory, and circuitry to connect to and communicate over a radio access network (RAN) that implements a particular radio access technology (RAT) over a wired network, over a wireless local area network (WLAN) (e.g., based on IEEE 802.11, etc.), and/or with other devices via a direct device-to-device (D2D) or peer-to-peer (P2P) connection (e.g., a Bluetooth® connection).

According to various aspects, FIG. 1 illustrates an exemplary wireless mesh network 100 in which the various aspects described herein may be suitably implemented. More particularly, the example wireless mesh network 100 may comprise various nodes 110, which may optionally be organized as a group 112, a controller 120 (e.g., a mobile device), a gateway 130, and a configuring infrastructure 150 in communication via a network "cloud" 140 (e.g., the Internet). Furthermore, although the controller 120 and the gateway 130 are depicted in FIG. 1 as elements separate from the nodes 110, those skilled in the art will appreciate that the controller 120 and/or the gateway 130 can be included among the nodes 110 in various aspects. In general, the nodes 110 may be the basic building blocks of the wireless mesh network 100, wherein the nodes 110 may comprise any suitable device that can be configured to send, receive, and relay messages to surrounding nodes 110 (i.e., devices). In various aspects, message communication among the nodes 110 may generally be based on broadcast messages, which may be transmitted via one or more wireless channels.

According to various aspects, the controller 120 (which may also be referred to as a provisioner node, as described further herein) may be configured to establish a wireless connection 122 with the nodes 110, whereby the controller 120 may use a wireless radio to communicate with the nodes 110 in the wireless mesh network 100. Furthermore, in various aspects, the controller 120 may have an additional communication path 124 to the wireless mesh network 100. For example, in various aspects, the controller 120 may use a configuring application to communicate with the configuring infrastructure 150 via the additional communication path 124 (e.g., via a web console or service). As such, the configuring infrastructure 150 may service configuration commands received from the controller 120 (e.g., to securely distribute a network key to a new node 110, to program a particular node 110 to be within the group 112 or another group, etc.).

In various aspects, the gateway 130 (e.g., an access point) may link the various nodes 110 to the network 140 and allow command and control over a local area network (LAN) or wireless LAN (WLAN) to which the gateway 130 is connected. Like other elements in the wireless mesh network 100, the gateway 130 may also use a wireless radio to communicate with the various nodes 110 via a wireless channel According to various aspects, the wireless mesh network 100 may enable the nodes 110 to send, receive, and/or relay messages (e.g., command and control operations), which may originate at one or more of the nodes 110 and/or be received from the controller 120 via the wireless connection 122 or from the gateway 130 via the additional communication path 124 between the controller 120 and the nodes 110.

According to various aspects, at least the nodes 110, the controller 120, and the gateway 130 may be configured to communicate with one another via a wireless mesh protocol, which may generally enable devices to send, receive, and relay messages to surrounding devices located within radio range, thus forming an ad-hoc mesh network. For example, message communication may be based on broadcast messages transmitted and received via one or more wireless channels (e.g., a Bluetooth® broadcast channel), wherein each node 110 that receives a broadcast message may accept and forward the message to other nodes 110 within radio range. In this manner, the range over which the nodes 110 can communicate may be easily extended, as one or more intermediate nodes 110 can be used to relay a message to another node 110 that is otherwise located outside radio range of the originating node 110. As such, the wireless mesh protocol may enable the wireless mesh network 100 to be easily extended to accommodate new devices, which can also increase the geographic coverage of the wireless mesh network 100 depending on device placement. The wireless mesh protocol can therefore be used to support various different use cases that are built, at least in part, on point-to-point, point-to-multipoint, and/or other suitable wireless communications.

Figure 2:
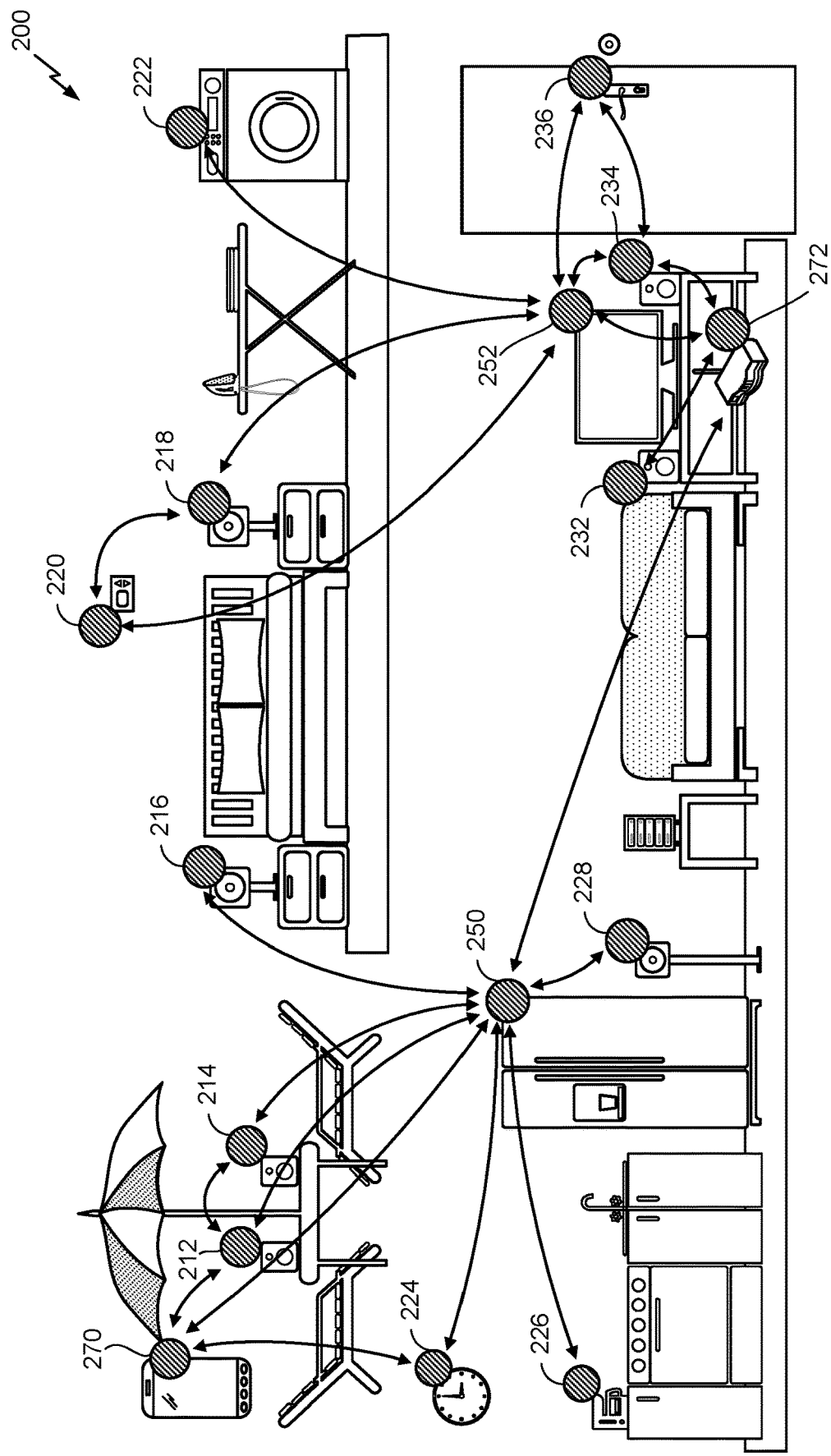
FIG. 2 illustrates an exemplary environment in which a wireless mesh network implementing the various aspects described herein may be deployed.

According to various aspects, FIG. 2 illustrates one exemplary environment 200 in which a wireless mesh network may be suitably implemented. In the exemplary environment 200 shown in FIG. 2, the wireless mesh network supports a home automation or an IoT use case, where home appliances, lights, electrical switches, thermostats, etc. can form a wireless mesh network and be controlled via the wireless mesh protocol, either directly using one or more user devices or indirectly via a gateway device in communication with the one or more user devices (e.g., a smartphone, a laptop computer, etc.). For example, the particular environment 200 as shown in FIG. 2 includes a smartphone 270 (which may correspond to controller 120), outdoor speakers 212 and 214, bedroom speakers 216 and 218, a thermostat 220, a laundry machine 222, a clock 224, a coffee machine 226, a refrigerator 250, a kitchen speaker 228, family room speakers 232 and 234, a television 252, an electronic lock 236, and a home gateway device 272 (which may correspond to gateway 130 in FIG. 1). The various devices may communicate with other devices within sufficient range (e.g., via broadcast messages) and the messages may be received and relayed as appropriate to ensure that the message(s) reach the intended destination. For example, in the environment 200 shown in FIG. 2, a user may press a button on the smartphone 270 to engage the electronic lock 236, which is located outside radio range from the smartphone 270. However, the smartphone 270 is within radio range from the outdoor speakers 212 and 214, the clock 224, and the refrigerator 250. Accordingly, the smartphone 270 may broadcast a message containing a command to engage the electronic lock 236, and the outdoor speakers 212 and 214, the clock 224, and the refrigerator 250 may each relay the message until the message eventually reaches the electronic lock 236.

Figure 3:
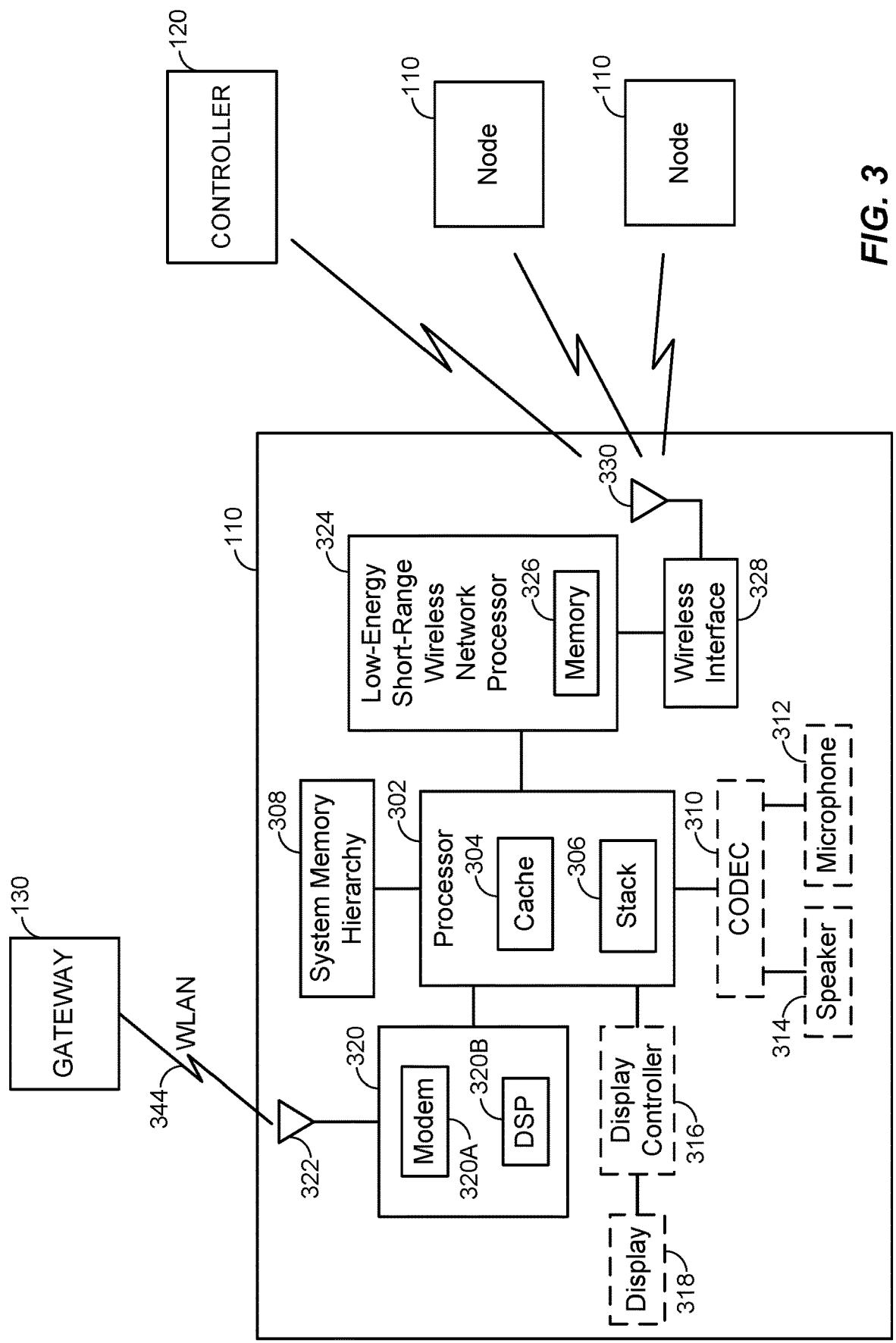
FIG. 3 illustrates an exemplary mesh network node device according to at least one aspect of the disclosure.

FIG. 3 illustrates an exemplary node 110 according to at least one aspect of the disclosure. A main processor 302 for the node 110 runs applications that cause the node 110 to perform the functionality described herein, and includes a cache memory 304 as well as an interface to store and retrieve data and instructions from off-chip memory, represented in FIG. 3 as the system memory hierarchy 308. The system memory hierarchy 308 may comprise various volatile and non-volatile memory systems.

The node 110 is capable of interfacing with wireless local area networks by way of a communication device 320 and an antenna 322. The communication device 320 is illustrated as comprising a modem 320A and a digital signal processor (DSP) 320B, although in practice other kinds of modules may be employed, all or some such modules may be integrated on a single chip, and some of the modules may be integrated with the processor 302. In an aspect, the communication device 320 may alternatively be referred to as a transceiver or wireless interface. In the example of FIG. 3, the node 110 has a WLAN link 344 to the gateway 130, which provides access to the network 140 (not shown).

In an aspect, the main processor 302 may implement a low-energy short-range wireless network protocol stack 306, such as a Bluetooth® Low Energy (BLE) protocol stack or a Bluetooth® mesh protocol stack, in which instructions for performing some or all of the low-energy short-range wireless network protocol stack 306 are stored in the system memory hierarchy 308. However, in the example of FIG. 3, a separate chip or an embedded hardware core, shown as a low-energy short-range wireless network processor 324, implements the portions of the low-energy short-range wireless network protocol stack 306 to perform the low-energy short-range wireless network operations described herein. The low-energy short-range wireless network processor 324 comprises a memory 326, shown as an on-chip memory, although the memory 326 may be part of a memory hierarchy in which some memory also resides off-chip. The wireless interface 328 provides an interface to the antenna 330, suitable for operating in the designated frequency spectrum utilized by the low-energy short-range wireless network. Communication may be made to any number of low-energy short-range wireless network capable devices, such as one or more other nodes 110 (two in the example of FIG. 3, but there may be more or fewer than two). The instructions for implementing some or all of the low-energy short-range wireless network operations described herein may be stored in a memory, such as memory 326. The memory 326 may be referred to as a non-transitory computer-readable medium.

As illustrated in FIG. 3, the node 110 includes both a communication device 320 that permits the node 110 to act as an access terminal to the gateway 130, and a low-energy short-range wireless network processor 324 and wireless interface 328 that together permit the node 110 to act as a low-energy mesh network node in a low-energy mesh network, such as wireless mesh network 100. For example, the node 110 may receive information for another node 110 from the gateway 130 via the communication device 320. The node 110 may establish a connection with all downlink nodes 110 and transmit the information in one or more data packet(s) to the downlink nodes 110 using the low-energy short-range wireless network processor 324 and wireless interface 328.

The node 110 may optionally include a user interface. As shown in FIG. 3, the node 110 may include a CODEC (Coder-Decoder) 310 for interfacing with a microphone 312 and a speaker 314. A display controller 316 provides an interface to a display 318 so that the user may interact with the node 110.

In an aspect, the low-energy short-range wireless network processor 324, as directed by instructions stored in memory 326, may cause the node 110 to perform the operations described herein. Thus, for example, the low-energy short-range wireless network processor 324, the memory 326, and the wireless interface 328 may all be used cooperatively to load, store, and execute the various operations disclosed herein, and as such, the logic to perform these operations may be distributed over various elements. Alternatively, the functionality could be incorporated into one discrete component (e.g., the low-energy short-range wireless network processor 324). Therefore, the features of the node 110 are to be considered merely illustrative and the disclosure is not limited to the illustrated features or arrangement.

Nodes in a mesh network (e.g., wireless mesh network 100) may communicate with each other using various wireless communication protocols, such as Zigbee, Thread, Bluetooth®, and the like. The Bluetooth® protocol used for mesh networks is referred to as "Bluetooth® mesh" and is described in various publicly available specifications from the Bluetooth® Special Interest Group (SIG). Bluetooth® mesh builds on the Bluetooth® Low Energy (BLE) protocol, which is described in various publicly available specifications from the Bluetooth® SIG.

Figure 4:
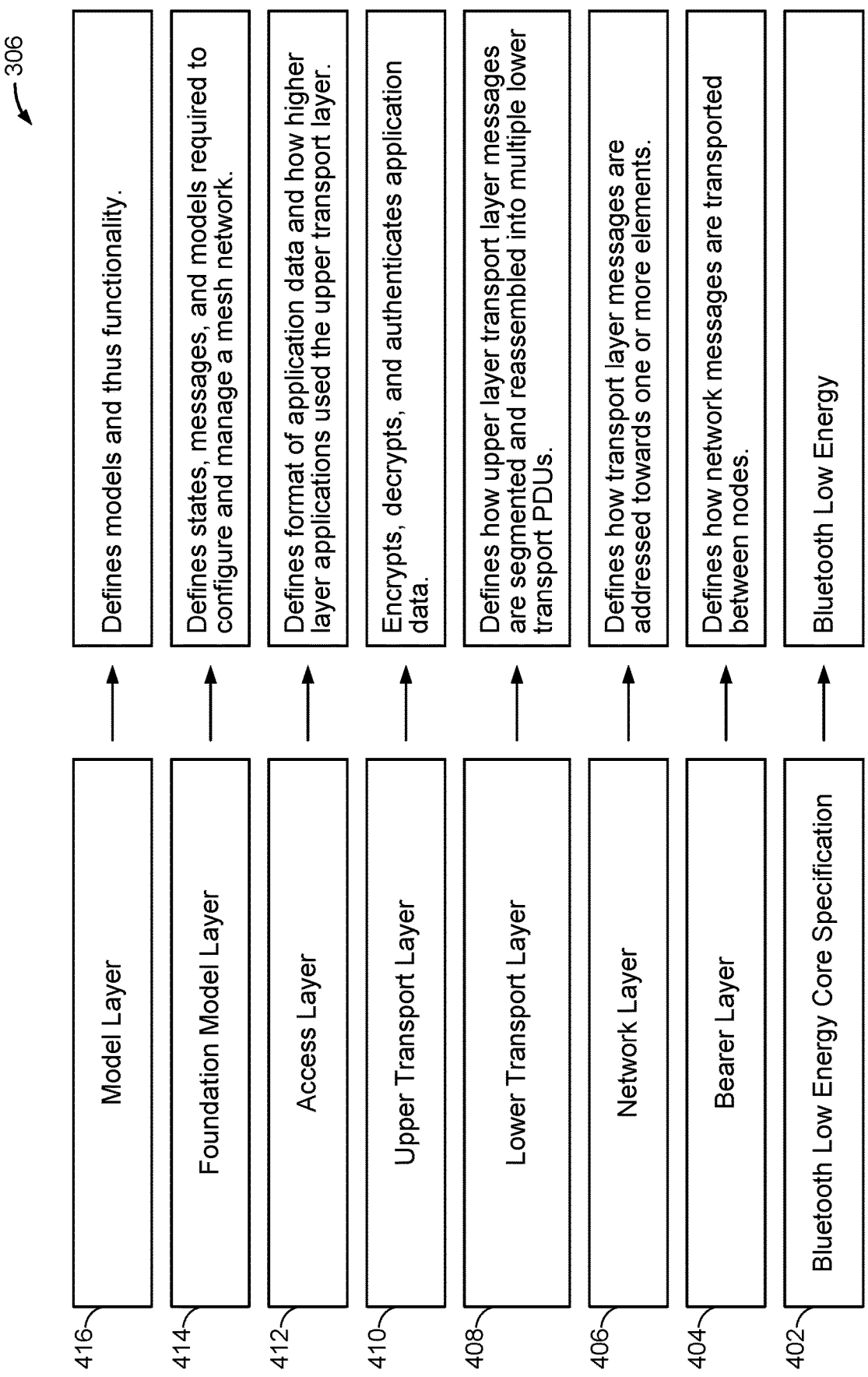
FIG. 4 illustrates the layers of the Bluetooth® mesh stack.

FIG. 4 illustrates the layers of the Bluetooth® mesh stack, which may, in an aspect, correspond to the low-energy short-range wireless network protocol stack 306 in FIG. 3. As illustrated in FIG. 4, Bluetooth® mesh is not integrated into the BLE stack, but rather, is a separate entity on top of the BLE stack. Thus, on top of the BLE Core Specification layer 402, the Bluetooth® mesh stack includes a bearer layer 404, a network layer 406, a lower transport layer 408, an upper transport layer 410, an access layer 412, a foundation model layer 414, and a model layer 416. When a Bluetooth® mesh node (e.g., node 110) receives a message, it passes the message up the layers from the underlying BLE stack (i.e., BLE Core Specification layer 402) via the bearer layer 404 to the network layer 406. The network layer 406 applies various checks to decide whether to pass the message to the transport layers 408 and 410 or discard it.

Bluetooth® mesh uses four types of nodes, Relay Nodes, Low Power Nodes (LPNs), Proxy Nodes, and Friend Nodes. Relay Nodes receive and forward messages across the mesh network. Relay Nodes generally remain in an active, or awake, mode, which significantly increases power consumption. This is not a disadvantage for mains-powered applications (where the node is hardwired or plugged in to a power source) such as smart lighting, but is a problem for non-mains-powered nodes such as switches that are incorporated into the mesh network. As such, Relay Nodes are generally mains-powered.

LPNs use the standard power-saving characteristics of BLE (e.g., remaining in a sleep state for long periods) and can therefore operate for long periods on battery power. Each LPN is connected to a mains-powered Friend Node, which remains in an active, or awake, mode and caches any messages directed to the LPN. When the LPN enters a receive mode (according to a predetermined schedule), it polls the Friend Node for any messages stored in the Friend Node's cache. The Friend Node sends all of the cached messages to the LPN (referred to as response messages), which operates as instructed and then returns to a power-saving sleep mode.

Proxy Nodes allow devices that do not include the Bluetooth® mesh stack to connect to a Bluetooth® mesh network. This is useful, for example, when a consumer wishes to use a legacy smartphone to control a smart lighting mesh network. Interaction is achieved via both the proxy node and the device's Generic Attribute Profile (GATT) interface.

Thus, with reference to FIG. 2, the thermostat 220 (battery powered) may be an example of an LPN and the bedroom speaker 218 and/or the television 252 (if mains-powered) may be examples of Friend Nodes. As another example, the clock 224 (battery powered) may be an LPN and the refrigerator 250 (mains-powered) may be a Friend Node. Further, the refrigerator 250, the television 252, and the laundry machine 222, for example, may be Relay Nodes, as they are all mains-powered. The outdoor speakers 212 and 214, the bedroom speaker 218, and the family room speaker 234 may also be Relay Nodes, even if not mains-powered, as illustrated in FIG. 2.

Each node in a wireless mesh network (e.g., wireless mesh network 100) has its own device key (a unique private device-specific key, referred to as a "DevKey" in Bluetooth® mesh) known only to itself and the Provisioner Node. Each node in the wireless mesh network shares a network key (a public network-specific key, referred to as a "NetKey" in Bluetooth® mesh). Before a new node can take part in routine mesh operations, it is "provisioned" (i.e., onboarded to the mesh network) by the Provisioner Node through a process call "provisioning." This is a trusted device with access to all of the nodes in the mesh network. For example, the Provisioner Node may be the controller 120 in FIG. 1. The new node is assigned an address (e.g., an Internet Protocol (IP) address), along with the network and device keys. After provisioning, the device key is used to establish a secure channel with the Provisioner Node to configure the new node.

Provisioning is generally accomplished using an application installed on the

Provisioner Node (e.g., controller 120). The Bluetooth® mesh provisioning procedure uses the Elliptic Curve Diffie-Hellman (ECDH) key agreement protocol and a 256-bit Elliptic Curve Cryptography (ECC) public-private key exchange to distribute provisioning data. ECDH is an anonymous key agreement protocol that allows two parties, each having an ECC public-private key pair, to establish a shared secret over an insecure channel. ECDH's purpose in Bluetooth® mesh provisioning is to allow the creation of a secure link between the Provisioner Node and the unprovisioned device. It uses public and private keys to distribute a symmetric secret key that the two devices can then use for encryption and decryption of subsequent messages.

The provisioning procedure is intended to accomplish two tasks. The first is to authenticate the unprovisioned device. In a Bluetooth® mesh network, for example, there may be several, dozens, or hundreds of devices in a small space. Authentication is performed to make sure that the device the Provisioner Node interacts with is the device the user wants to provision. The second is to build a secure link with the unprovisioned device to share information with it. At the end of the process, the unprovisioned device will be a node in the Bluetooth® mesh network.

Figure 5:
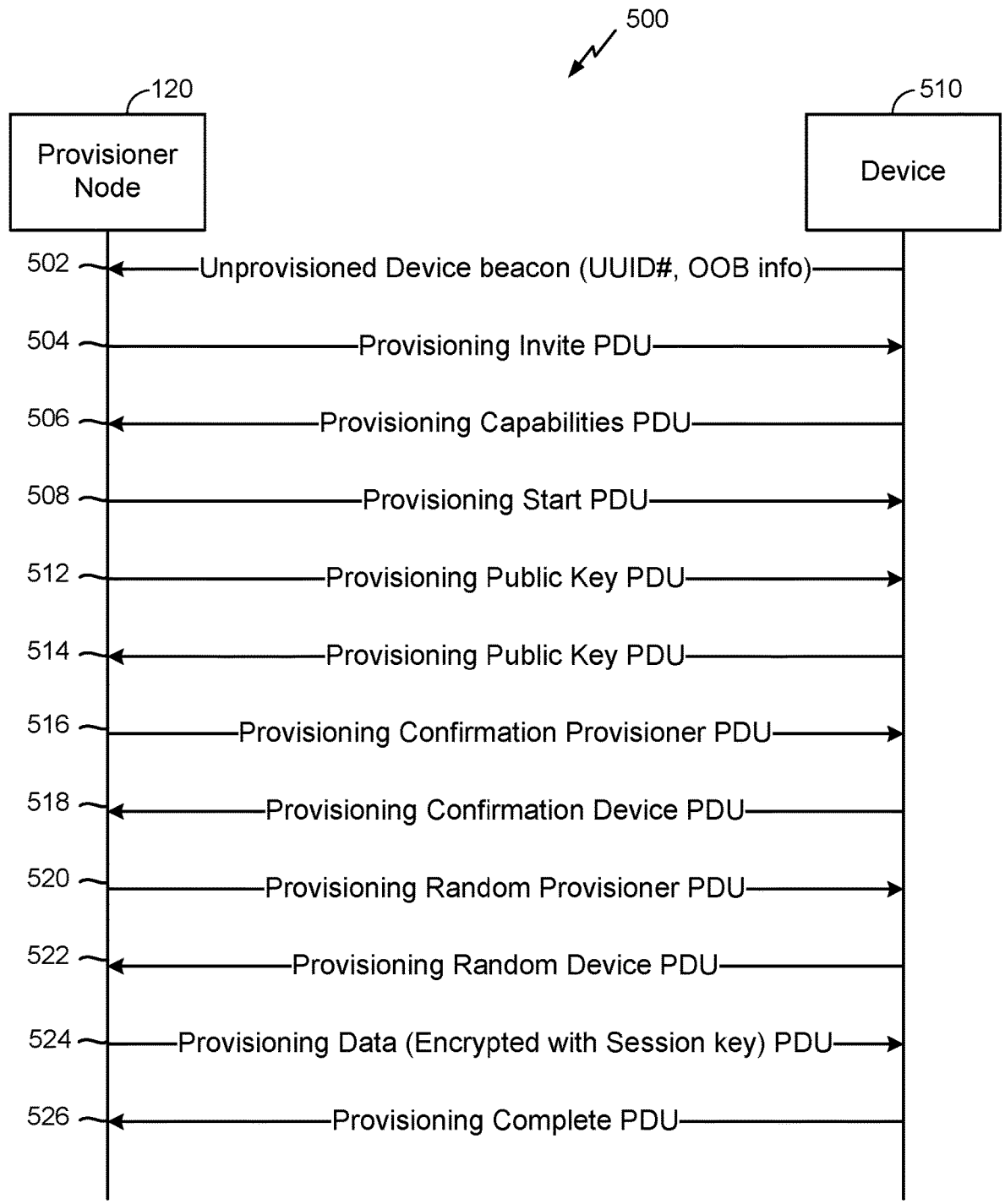
FIG. 5 shows an exemplary method illustrating a Provisioner Node provisioning an unprovisioned device in a Bluetooth® mesh network.

FIG. 5 shows an exemplary method 500 illustrating the controller 120 (in its capacity as a Provisioner Node) provisioning an unprovisioned device 510 in a Bluetooth® mesh network. The device 510 may correspond to a node 110 before it is provisioned. The controller 120 and the device 510 may communicate with each other according to the Bluetooth® mesh protocol using their respective low-energy short-range wireless network processors 324 and wireless interfaces 328.

At 502, the device 510 indicates its availability to be provisioned by transmitting an Unprovisioned Device beacon in one or more advertising packets. The user may need to start the device 510 advertising in this way by, for example, pressing a combination of buttons on the device 510 or holding down a button on the device 510 for a certain length of time. The beacon message may include the Universally Unique Identifier (UUID) of the device 510.

At 504, the controller 120 sends an invitation to the device 510 in the form of a Provisioning Invite Protocol Data Unit (PDU). At 506, the device 510 responds with information about itself in a Provisioning Capabilities PDU. The Provisioning Capabilities PDU may include the number of elements the device 510 supports, the set of security algorithms supported (e.g., ECDH), the availability of its public key using an Out-of-Band (OOB) method, the ability for the device 510 to output a value to the user (e.g., display screen LED(s), speaker(s), etc.), and/or the ability for the device 510 to receive a value inputted by the user (e.g., touchscreen, button(s), microphone, etc.). In Bluetooth® mesh, a device 510 may support more than one element. An element is an entity that will have a unicast address through which other devices in the mesh network can communicate. For example, a mesh-capable four switch extension board will have four elements, indicating the four different switches. Or, for example, one element of a device 510 may support turning a light on or off, and another element may support changing the color of the light.

At 508, the controller 120 sends a Provisioning Start PDU to the device 510, which indicates to the device 510 that the controller 120 does not know the public key of the device 510. Thus, at 512 and 514, the controller 120 and the device 510 exchange their public keys in Provisioning Public Key PDUs, either directly (e.g., over their Bluetooth® connection) or using an OOB method (e.g., the device 510 flashes its LED some number of times and the user enters the number into the user interface of the controller 120). The generation of the public keys is described below with reference to FIG. 6. At 516, the controller 120 sends a Provisioning Confirmation Provisioner PDU to the device 510, and at 518, the device 510 sends a Provisioning Confirmation Device PDU to the controller 120, thereby confirming that each device has received the other's public key.

At 520, the controller 120 outputs a random, single or multi-digit number to the user in some form, such as by displaying it on a touchscreen of the controller 120. At 522, the device 510 also outputs a random, single or multi-digit number to the user in some form, using an action appropriate to its capabilities. For example, it might flash its LED the number of times of the random number, or beep that number of times. The user enters the number(s) output by the controller 120 and the device 510 into the device 510 and controller 120, respectively, and a cryptographic exchange takes place between the two devices, involving the random number, to complete the authentication of each of the two devices to each other.

After authentication has successfully completed, a session key is derived from the ECDH shared secret by each of the two devices from their private keys (e.g., the "DevKey" in Bluetooth® mesh) and the exchanged public keys. More specifically, both the controller 120 and the device 510 calculate the ECDH shared secret using their own pair of public keys (exchanged at 512 and 514) and private keys. The ECDH algorithm is used by each device to securely calculate the session key by exchanging public keys, calculating an ECDH shared secret using the public key, and then generating a session key from the common ECDH secret.

At 524, the controller 120 uses the session key to encrypt the subsequent distribution of the data used to complete the provisioning process, including a network key (e.g., the "NetKey" in Bluetooth® mesh), which is transmitted in a Provisioning Data PDU to the device 510. At 526, upon receipt of the Provisioning Data PDU, the device 510 sends a Provisioning Complete PDU to the controller 120 to complete the provisioning process. After provisioning has completed, the provisioned device 510 possesses the mesh network's NetKey, a mesh security parameter known as the IV Index, and a unicast address for the device 510, allocated by the controller 120. It is now known as a "node" in the mesh network, such as a node 110 in wireless mesh network 100.

Figure 6:
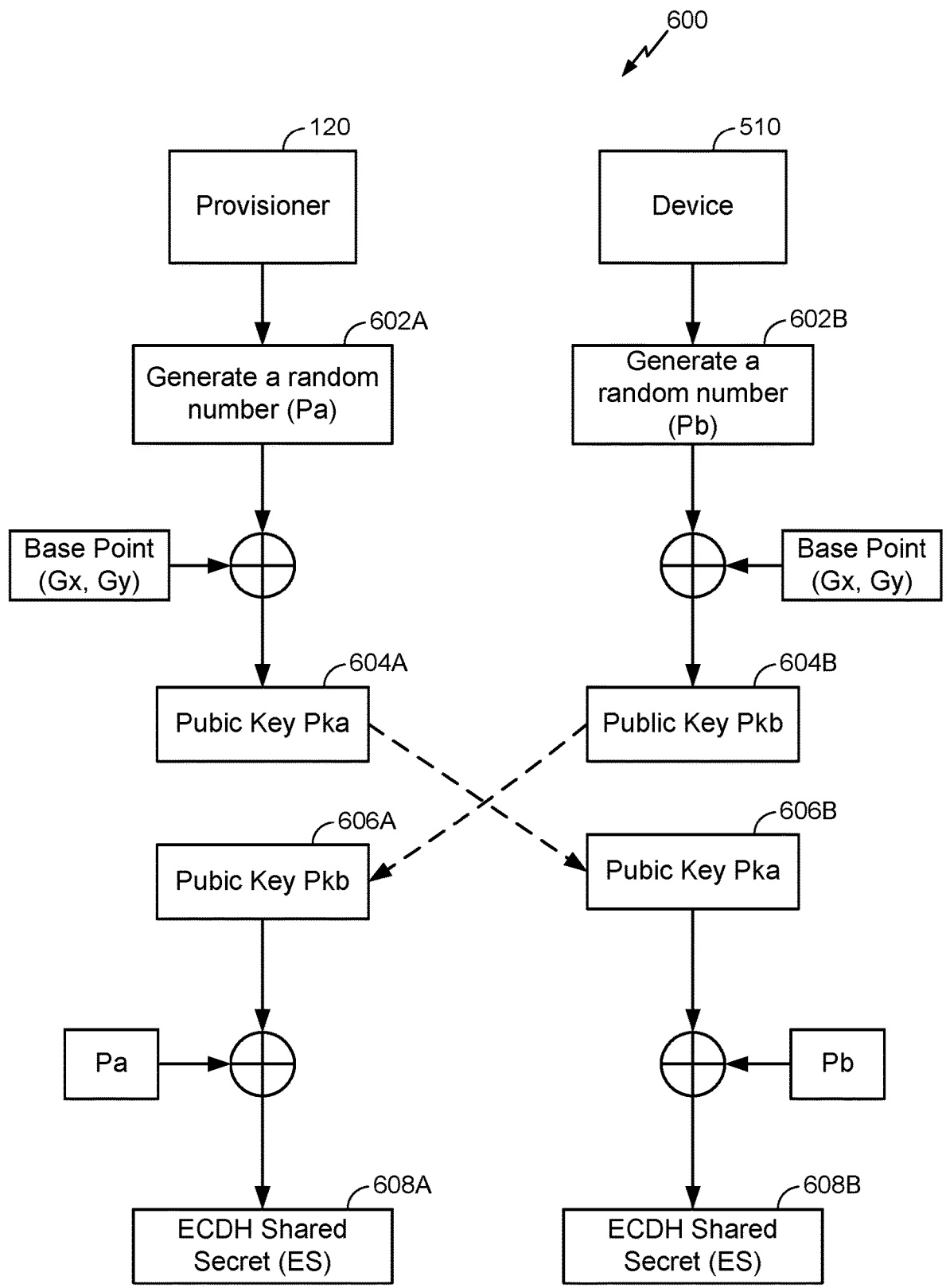
FIG. 6 illustrates an exemplary method for Elliptic Curve Diffie-Hellman (ECDH) shared secret generation using an Elliptic Curve Cryptography (ECC) public-private key exchange procedure.

FIG. 6 illustrates an exemplary method 600 for ECDH shared secret generation using an ECC-256 public-private key exchange procedure. The method 600 may be performed by two nodes in a mesh network, such as the controller 120 (in its capacity as the Provisioner Node) and the device 510, during the provisioning process illustrated in FIG. 5, specifically, at 512 and 514. The controller 120 and the device 510 may communicate with each other according to the Bluetooth® mesh protocol using their respective low-energy short-range wireless network processors 324 and wireless interfaces 328.

At 602A/B, each device generates a random number, referred to as "Pa" for the controller 120 and "Pb" for the device 510. At 604A/B, using the same base point (Gx, Gy) (the base point from which the elliptic curve for the ECDH algorithm is generated) and the random number generated at 602A/B, each device generates its public key, referred to as "Pka" for the controller 120 and "Pkb" for the device 510, and transmits it to the other device in Provisioning Public Key PDUs. At 606A/B, each device receives the other device's public key. The exchange at 604A/B and 606A/B corresponds to 512 and 514 of FIG. 5. At 608A/B, each device uses the random number generated at 602A/B and the public key received at 606A/B to generate its ECDH shared secret (ES). This is the shared secret that is then used to generate the session key after authentication has successfully completed at 522 of FIG. 5.

Bluetooth® mesh uses an advertisement bearer to relay packets from a source node to one or more destination nodes. It makes use of three fixed advertisement channel frequencies to broadcast such packets. The absence of a channel hopping scheme opens the opportunity for a sniffer/attacker node to easily identify messages being communicated across the nodes of the mesh network and introduces various types of attacks including eavesdropping, replay attack, Man-in-the-Middle (MITM), and the like. As such, a goal of Bluetooth® mesh is to secure all messages against the above-mentioned attacks with the assistance of its security "toolbox."

Security threats in a Bluetooth® mesh network fall into the following categories: (1) threats while provisioning a node that has no or minimal OOB support, and (2) threats from rogue devices that have been accepted into the mesh network.

Referring first to threats while provisioning, as discussed above with reference to FIG. 5, along with the 256-bit ECC, the provisioning process may also use optional OOB information to authenticate the unprovisioned device 510, such as the public key of the device 510 (programmed in the device 510) transmitted at 514, a 16-octet secret key (programmed in the device 510), a value being input into the device 510 (via its user interface) at 520, and/or a randomly generated value displayed on the device 510 (via its user interface) at 522. In Bluetooth® mesh, the provisioning data subsequently transmitted at 524 includes the network key (e.g., NetKey), the key index, flags, the IV Index, and the unicast address of the new node. The encrypted provisioning data and the provisioning data Message Integrity Check (MIC) include the Advanced Encryption Standard (AES) Counter with Cipher Block Chaining Message Authentication Code (CBC-MAC) (AES-CCM) of the session key, the session nonce, and the provisioning data, represented as: "AES-CCM (SessionKey, SessionNonce, Provisioning Data)." The SessionNonce parameter is represented as "k1(ECDHSecret, ProvisioningSalt, 'prsn')," the SessionKey parameter is represented as "k1(ECDHSecret, ProvisioningSalt, 'prsk')," the ProvisioningSalt parameter is represented as "s1(ConfirmationSalt‖RandomProvisioner‖RandomDevice)," the ConfirmationSalt parameter is represented as "s1(ConfirmationInputs)," the ConfirmationInputs parameter is represented as "ProvisioningInvitePDUValue‖ProvisioningCapabilitiesPDUValue‖ProvisioningStartPDUValue‖PublicKeyProvisioner‖PublicKeyDevice," the s1(M) parameter is represented as "AES-CMAC$_{ZERO}$(M)," and the k1(N, SALT, P) parameter is represented as "AES-CMACT(P), key T=AES-CMAC$_{SALT}$(N)." CMAC stands for "Cipher-based Message Authentication Code."

The security of the provisioning data transmitted at 524 depends greatly on the ECDH shared secret that is used to generate the session key and the session nonce. A MITM attacker can easily generate a pair of ECDH shared secrets by posing as an unprovisioned device to the actual Provisioner Node and at the same time as the Provisioner Node to the actual device being provisioned. However, this obvious attack is prevented using the additional confirmation and random value generation exchange and validation steps at 516 to 522.

Figure 7:
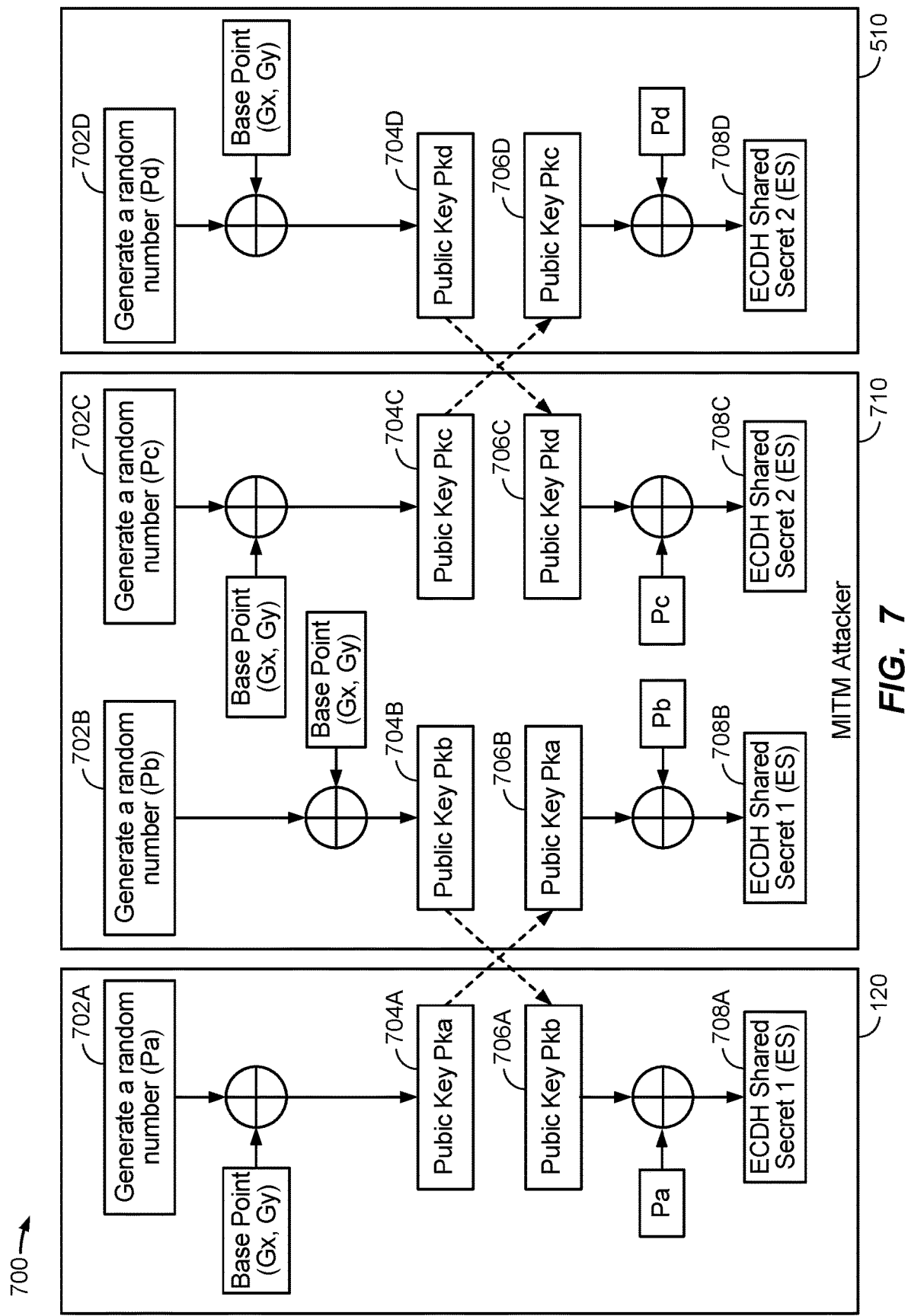
FIG. 7 illustrates an exemplary method of a Man-in-the-Middle (MITM) attacker taking part in the ECDH shared secret generation of FIG. 6.

FIG. 7 illustrates an exemplary method 700 of a MITM attacker taking part in the ECDH shared secret generation of FIG. 6. The method 700 may be performed by three nodes in a mesh network, such as the controller 120 (in its capacity as the Provisioner Node), the device 510, and an MITM attacker 710 (which may correspond to a node 110) during the provisioning process illustrated in FIG. 5, specifically, at 512 and 514. The controller 120, the device 510, and the MITM attacker 710 may communicate with each other according to the Bluetooth® mesh protocol using their respective low-energy short-range wireless network processors 324 and wireless interfaces 328.

At 702A and 702D the controller 120 and the device 510 generate a random number, referred to as "Pa" and "Pd," respectively. At the same time, at 702B, the MITM attacker 710 generates a random number as if it is the device 510, referred to as "Pb," and at 702C, generates a random number as if it is the controller 120, referred to as "Pc." At 704A and 704D, using the same base point (Gx, Gy) and the random numbers generated at 702A and 702D, the controller 120 and the device 510 generate their public keys, referred to as "Pka" and "Pkd," respectively. At 704B and 704C, also using the same base point (Gx, Gy) and the random numbers generated at 702B and 702C, the MITM attacker 710 generates two public keys, one for the controller 120, referred to as "Pkb," and one for the device 510, referred to as "Pkc."

At 706A and 706D, the controller 120 and the device 510 receive the public keys from the MITM attacker 710. At 706B and 706C, the MITM attacker 710 receives the public keys from the controller 120 and the device 510. At 708A and 708D, the controller 120 and the device 510 use the random number generated at 702A and 702D and the public keys received at 706A and 706D to generate their ECDH shared secrets (ES). At 708B and 708C, the MITM attacker 710 uses the random numbers generated at 702B and 702C and the public keys received at 706B and 706C to generate the ECDH shared secret for the controller 120 and the device 510, respectively. The MITM attacker 710 now has the shared secret that will be used to generate the session key after authentication has successfully completed at 522 of FIG. 5.

As noted above, an MITM attack can be prevented using the additional confirmation and random value generation exchange and validation steps at 516 to 522. Generation of the provisioner confirmation and the device confirmation uses the following parameters:

ConfirmationKey=k1(ECDHSecret, ConfirmationSalt, "prck")

ConfirmationSalt=s1(ConfirmationInputs)

ConfirmationInputs=ProvisioningInvitePDUValue‖ProvisioningCapabilitiesPDUValue‖ProvisioningStartPDUValue‖PublicKeyProvisioner‖PublicKeyDevice ConfirmationProvisioner=AES-CMAC$_{ConfirmationKey}$(RandomProvisioner‖AuthValue)

ConfirmationDevice=AES-CMAC$_{ConfirmationKey}$(RandomDevice‖AuthValue)

The AuthValue field is nonzero for devices supporting OOB. The OOB value is the only value that is not broadcasted over the mesh network, and is used to calculate the AuthValue. An MITM attacker will therefore not be able to generate the required confirmation value for the Provisioner Node and the device being provisioned if the following conditions are met: (1) AuthValue is never transmitted over the mesh network, and (2) the 16 octets AuthValue is non-zero and does not contain only one or two octets of data.

The AuthValue field is zero for devices that do not support OOB, or it could contain small one or two octet values for devices that limit the length of input and output OOB values. Provisioning such devices in the network opens up the opportunity for an active attacker to easily bypass the security imposed by confirmation and random exchange and to eventually determine the provisioned data from the Provisioner Node by generating the session key and session nonce.

The problem of an attacker knowing the network key can be catastrophic for the entire mesh network because the network key not only controls the network layer behavior of the device that is currently being provisioned, but also the nodes in the same network that have been previously provisioned. As such, even if a majority of the nodes in a mesh network support strong OOB information, a single node that only supports very basic OOB information or does not support any OOB information will put the entire network at risk. Further, if the network key is known, the attacker can easily generate information that is derived from the network key, such as the encryption key, the privacy key, the beacon key, the identity key, the network identifier, and the friendship key. Having these keys allows the attacker to sniff, control, or even disrupt the operations of nodes present in the network.

For example, the device-specific key (e.g., "DevKey") is derived from the ECDH secret and the provisioning salt as follows: DevKey=k1(ECDHSecret, ProvisioningSalt, "prdk"). Thus, knowing the ECDH secret allows the MITM attacker to gain unauthorized access to the device-specific key of the device being provisioned. Further, since the application key (the key used to encrypt traffic for a specific application running on the node) is shared using the device-specific key, the attacker will know the application key, which will eventually give it complete control over the device being compromised.

Thus, an MITM attack can be quite easy in a mesh network having at least one node that supports no or minimal OOB information, but quite difficult in a mesh network in which every node supports a 16-byte OOB value. The impact severity of a successful MITM attack can be quite critical. If an attacker is successful in breaking a provisioning procedure by attacking the weakest node in the network, it will be able to obtain the following information: network key ("NetKey"), device-specific key ("DevKey") of the device being attacked, IV Index of the network, unicast address of the device being attacked, and the application key ("AppKey" in Bluetooth® mesh) being configured.

Referring now to an attack from a node present in the network, such a node can corrupt the source and sequence numbers of messages (or packets) being transmitted in the network, corrupt the Time-to-Live (TTL) value of messages being transmitted in the network, and/or corrupt the destination (DST) address of messages being transmitted in the network.

Referring to corruption of the source and sequence numbers of messages being transmitted in the network, it is likely that users will purchase devices from different vendors and provision these devices to form a single mesh network. Once all of the nodes are configured as part of the same mesh network, each one will have information about the Provisioner Node and neighboring nodes, and will have access to all other important network information. As such, any node could easily determine the network layer «SRC, SEQ» pair of its neighbor nodes, since the neighbor nodes have the same network key.

Devices from some manufacturers may have intelligence for modifying the «SRC, SEQ» cache of other nodes. For example, when a node "A" with a sequence number (SEQ) "N" sends a message to node "B," a rogue node can create a new message pretending to be node A with sequence number (SEQ) "M" (where M is significantly larger than N) and send it to node B. Because the «SRC, SEQ» cache is being updated in the Network Layer, node B, after verifying the network MIC of the rogue node, will update its «SRC, SEQ» to «A, M». Now, Node B will not process subsequent messages received from node A with sequence "N+1 to M." This is equivalent to the rogue node creating a Denial of Service (DoS) attack in the network. Since the user is likely unaware of the software running on devices manufactured by various vendors, it will be difficult for him or her to prevent, or even identify, such an attack.

Referring to corruption of the TTL, the TTL value in the network header is used to control flooding in the mesh network. Before relaying a message, each node will decrement the TTL value in the header of a received message and then broadcast it to the network. A packet with a TTL of zero will be processed by the receiving node but will not be relayed. Thus, a rogue node could block a message by using the TTL—specifically, the rogue node can set the TTL value to 0 instead of decrementing it by one, and as such, the message will not be further relayed in the network, preventing the actual destination node from receiving the message, which can eventually stop communication between two nodes and/or some set of nodes. Similarly, the rogue node can modify the TTL to the maximum value to cause unnecessary flooding of packets in the mesh network.

Referring to corruption of the DST address, the «DST, TransPDU» pair is generally encrypted using a 128-bit AES encryption with an encryption key derived from network key. Any node in the network can decrypt the encryption key and obtain the value of the DST address. A rogue node, before relaying a message, can change the DST address to a group address and then relay the message. In this case, the message, which was intended only for a single node, will reach multiple nodes, and all the receiving nodes will end up decrypting the packet and sending it to the transport layer because they are subscribed to the group address. These nodes will eventually end up dropping the message from the transport layer, as they will not be able to decrypt the message using their application key. In this way, the nodes will unnecessarily try to decrypt the message at the network layer (with success) and transport layer (with failure). This will drain the battery of the nodes unnecessarily, as the decryption is a complex process that involves a significant amount of computation, and hence, takes some amount of battery. A rogue node can continue to do this repeatedly, which will end up draining the battery of a certain set of nodes in the mesh network.

The ease of the possibility of such attacks is 100% if the network key (e.g., NetKey) is known. The impact severity of a successful attack can be critical if the attacker is successful in obtaining the network key, as it can sniff all network traffic (within communication range). It can also introduce a denial of service attack for all other nodes in the network, as described above.

The present disclosure provides various solutions to address the issues described above, (1) introduction of a monitoring device to the mesh network, (2) enhancements at the node device, and (3) safeguarding the provisioning procedure.

Referring first to the introduction of a monitoring device, with the advent of large scale automation and seamless operation of a complete mesh network, it is important that such a mesh network be continuously monitored (in real-time) to ensure that it is free of any security threats. This can be achieved by introducing a special device into the network as the network's "security monitor." Such a device could be a stationary node in the network, a mobile node in the network, embedded on a device of the user of the network (e.g., controller 120, gateway 130), or any other arrangement that would give it proximity to the maximum number of nodes in the mesh network. Such a security monitor should be capable of collecting all information (application key, network key, etc.) about each node from the Provisioner Node (e.g., during provisioning), sniffing all the messages being exchanged in the network among the nodes, creating message flow paths between source (SRC) and destination (DST) nodes by sniffing transmission packets, analyzing and uploading the collected information to one or more remote third-party storage servers (often referred to as the "cloud") and/or the user, and acting upon threats and reporting them to the user.

The monitoring device should be able to track attacking devices in the mesh network. For example, the monitoring device can help detect an active MITM attack and other attacks from nodes configured in the network. This can be done by, for example, the monitoring device closely observing provisioning messages exchanged between un-provisioned devices and the Provisioner Node. Since there are separate sets of messages for both the Provisioner node and the un-provisioned device, the monitoring device can determine if some other device in the network is sending both Provisioner Node and un-provisioned device messages. Whichever device is sending such messages is identified as the attacker.

The message processing capacity of the monitoring device should be quite high, as it should be able to listen to all of the messages being exchanged between all other nodes in the network, and should have additional information for those nodes, such as their addresses, their relative physical locations in the network, etc. Thus, for the monitoring device, it will be relatively easy to determine whether a single device (e.g., from its public Bluetooth® Device address) is behaving as both a Provisioner Node and the node being provisioned, and to then warn the user about such behavior. Additionally, the information gathered by the monitoring device can be sent to the "cloud" where it can be analyzed by, for example, a machine learning program. This program can search for different anomaly patterns in the mesh network to detect which node is the attacker node. As it is a machine learning program, the more data it has to analyze, the better the chances of identifying the correct attacker node.

The monitoring device can identify different signs, or behavior patterns, of an anomaly in the mesh network. For example, the monitoring device can maintain a table of the BD address, Received Signal Strength Indication (RSSI), and SRC ID of all nodes in the network. That way, if a node pretends to be a different node by changing its SRC ID while transmitting a message, the monitoring node will easily be able to identify it as an attacker node. As another example, the monitoring device can maintain «SRC, SEQ» information for each node in the mesh network. If an attacker node tries to change the sequence number of a relayed message, presumably with the intention of corrupting the «SRC, SEQ» cache of the destination node, then the monitoring device can easily identify it as an attacker node. As yet another example, the monitoring device will be able to determine whether the transport header of a message has been modified between the source and destination nodes, indicating that there is an attacker node in the mesh network. As yet another example, the monitoring device will be able to detect whether some node is modifying network packet header information, such as the TTL, control bit (CTL) (which identifies whether the message is a control message or an access message), SRC, and DST fields.

FIG. 8A illustrates a monitoring device 810 sniffing traffic transmitted between all of the nodes 110 in an exemplary mesh network 800. In an aspect, the monitoring device 810 is a node in the mesh network 800, and may have been provisioned (e.g., by controller 120), or may itself be the Provisioner Node. Because the monitoring device 810 has knowledge of the entire mesh network 800, it can predict the transmission contents of relay nodes between the source (SRC) and destination (DST) nodes. The monitoring device 810 and the Nodes 110 may communicate with each other according to the Bluetooth® mesh protocol using their respective low-energy short-range wireless network processors 324 and wireless interfaces 328.

As shown in FIG. 8A, Node A 110 is transmitting a message (or a packet) to Node C 110. The message is relayed from Node A 110 to Node B 110, from Node B 110 to Node X 110, and from Node X 110 to Node C 110. Each of the relay Nodes B 110 and X 110 decrement the TTL counter, which was originally set to 5, by 1, and none of the nodes changes the source (SRC) and sequence (SEQ) values of the message.

Since the monitoring device 810 knows the relay nodes between Node A 110 and Node C 110, when it sniffs a message transmitted by Node A 110 destined for Node C 110, it can predict the message headers that will need to be generated by both Nodes B 110 and X 110 for the message to reach Node C 110. In the example of FIG. 8A, each of the nodes is behaving as expected. However, in the example of FIG. 8B, Node X 110 is attempting to corrupt the message being relayed by Node B 110. In this case, the monitoring device 810 can quickly identify that Node X 110, which should have relayed the message with header parameters of «SRC=A, DST=C, SEQ=1, TTL=3», instead transmitted a message with header parameters of «SRC=A, DST=C, SEQ=100, TTL=100». As such, the monitoring device 810 can identify Node X 110 as an attacker and can notify the user of the attack and (optionally) remove the device from the mesh network 800. As would be appreciated, the monitoring device 810 can identify and analyze other patterns and make decisions based on the data provided.

After detection, an attacker node should be removed from the mesh network, or otherwise isolated from the remaining nodes in the network. The monitoring device (e.g., monitoring device 810) can record meta information about the attacker device (e.g., make, model, serial number, manufacturer, etc.) to report such behavior to the user and/or the manufacturer. Further, the effects of the attacker device should be normalized. First, because the network key(s) for the mesh network has/have been compromised, after removal of the attacker device, there is a need to change the network key(s). As such, a key refresh procedure should be initiated on all affected nodes in the network that use the compromised network key(s). Second, there is a need to flush the cache of all the nodes in the mesh network or restore their caches to the proper «SRC, SEQ» combination. To accomplish this, a separate configuration message command can be used, or the flushing of the sequence number should be made mandatory after the key refresh.

There are also enhancements that can be made at a node device (e.g., node 110) in the mesh network (e.g., wireless mesh network 100). For example, each node in the network can store the Angle of Arrival (AoA) of messages from of all of its neighboring nodes. In that way, when a node receives a message from a source node having a significantly different sequence number from previous messages from that source node, the receiving node can refrain from immediately updating its sequence-source cache for the source node. Instead, based on the previously stored AoA information, the receiving node can determine whether the message is from a known node but received from a different AoA from the last received message from that node, and if it is, and the sequence number is quite high compared to the sequence number last seen, then it may choose to ignore such messages for some period of time.

There are also ways to safeguard the provisioning procedure. For example, nodes that do not have input/output OOB capabilities should have some other means of ensuring they support the AuthValue. In an aspect, the AuthValue can be pre-programmed into these devices when they are manufactured. The Provisioner Node can connect to the device vendor's server and obtain the AuthValue for the device over some secure connection before provisioning the device. In another aspect, the transmit power of both the Provisioner Node and/or the device being provisioned should be decreased to prevent nearby devices from sniffing provisioning packets. As would be appreciated, the Provisioner Node and the device being provisioned should be placed closer together due to a lower transmit power being used. In addition, if both the Provisioner Node and the device being provisioned use a lower transmit power, the traffic between the two will be more secure, as other devices will not be able to sniff the traffic from either device.

Figure 9:
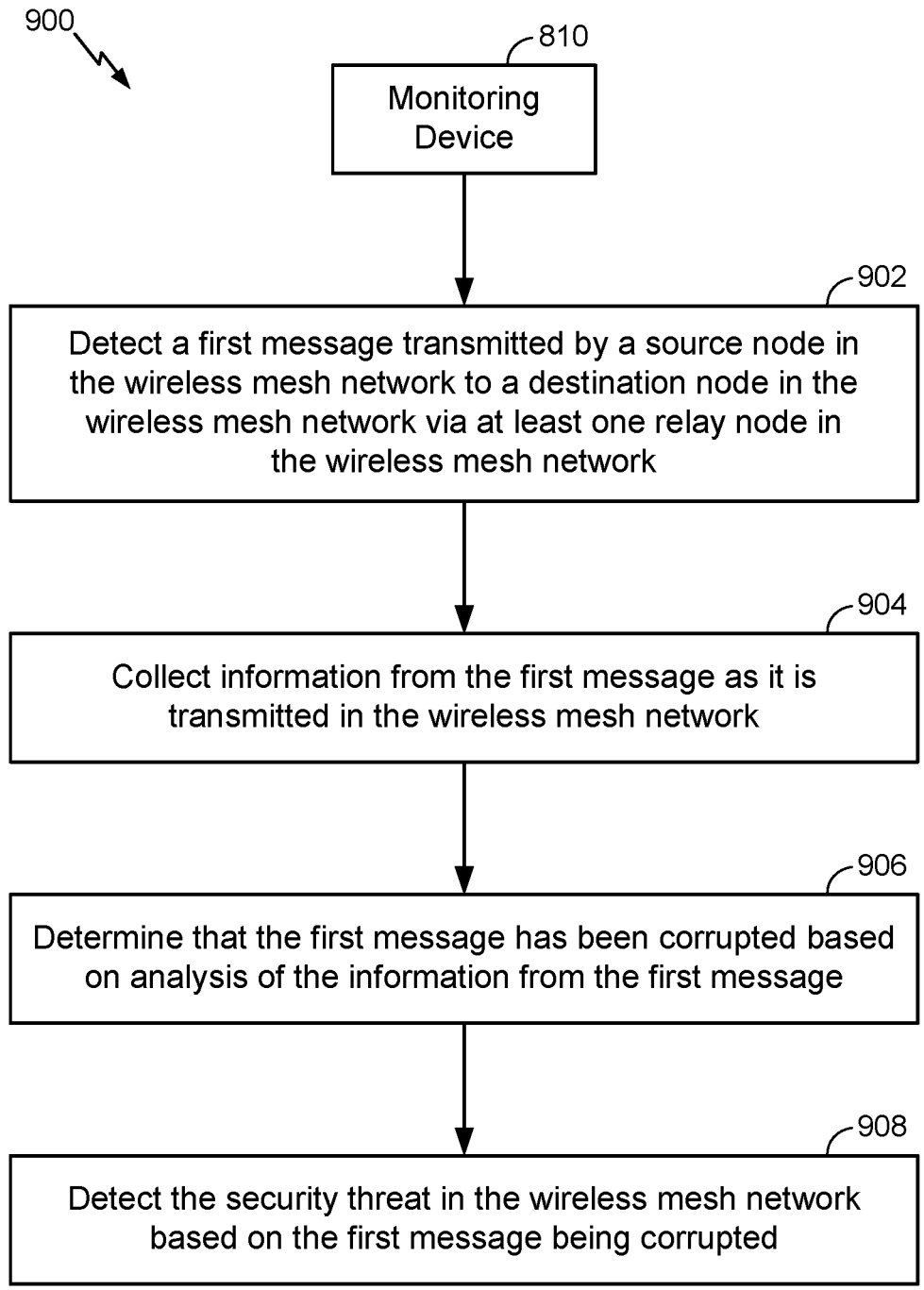
FIG. 9 illustrates an exemplary method for detecting a security threat in a wireless mesh network according to an aspect of the disclosure

FIG. 9 illustrates an exemplary method 900 for detecting a security threat in a wireless mesh network (e.g., wireless mesh network 100/800) according to an aspect of the disclosure. The method 900 may be performed by the monitoring device 810, which may correspond to a node 110 in the wireless mesh network 100. In some aspects, the monitoring device 810 may be a provisioner node in the wireless mesh network, and in other aspects may not be a provisioner node in the wireless mesh network. In some aspects, the monitoring device 810 may be a stationary mains-powered device in the wireless mesh network, and in other aspects the monitoring device 810 may be a battery-powered mobile device in the wireless mesh network. In some aspects, the wireless mesh network comprises a Bluetooth® mesh network.

At 902, the monitoring device 810 (e.g., low-energy short-range wireless network processor 324 in conjunction with wireless interfaces 328) detects a first message (or packet) transmitted by a source node (e.g., Node A 110 in FIGS. 8A/B) in the wireless mesh network to a destination node (e.g., Node C 110 in FIGS. 8A/B) in the wireless mesh network via at least one relay node (e.g., Node B 110 and/or Node X 110 in FIGS. 8A/B) in the wireless mesh network.

At 904, the monitoring device 810 (e.g., low-energy short-range wireless network processor 324 in conjunction with wireless interfaces 328) collects information (e.g., header information, such as SRC, DST, TTL, SEQ, etc.) from the first message as it is transmitted in the wireless mesh network. Together, 902 and 904 can be considered the monitoring device 810 "sniffing" the first message. As discussed above, the monitoring device 810 sniffs all messages (or packets) transmitted in the wireless mesh network in order to identify potential security threats, such as where message headers are being manipulated to increase the amount of traffic in the wireless mesh network or decrease it.

At 906, the monitoring device 810 (e.g., low-energy short-range wireless network processor 324 or processor 302) determines that the first message has been corrupted based on analysis of the information from the first message (e.g., a changed DST, SEQ, or TTL value). As discussed above, a corrupted message (or packet) is indicative of an attacker node in the wireless mesh network.

At 908, the monitoring device 810 (e.g., low-energy short-range wireless network processor 324 or processor 302) detects the security threat in the wireless mesh network based on the first message being corrupted. Once detected, the monitoring device 810 will be able to take appropriate action to mitigate the security threat, such as notifying the user and removing the attacking node from the wireless mesh network.

In an aspect, the detecting the security threat at 908 may include identifying (not shown), by the monitoring device 810 (e.g., low-energy short-range wireless network processor 324 or processor 302), the at least one relay node as the security threat in the wireless mesh network based on a determination that the first message has been corrupted by the at least one relay node. In that case, the method 900 may further include notifying (not shown), by the monitoring device 810 (e.g., low-energy short-range wireless network processor 324 or processor 302 in conjunction with the display controller 316 and display 318), a user of the wireless mesh network that the at least one relay node is the security threat. Alternatively, or additionally, the method 900 may further include notifying (not shown), by the monitoring device 810 (e.g., low-energy short-range wireless network processor 324 or processor 302 in conjunction with the communication device 320), a manufacturer of the at least one relay node that the at least one relay node is the security threat. Notifying the user and/or manufacturer that the at least one relay node is the security threat is beneficial to alert the user/manufacturer that there is a security threat in the wireless mesh network.

Further, where the monitoring device 810 identifies the at least one relay node as the security threat, in an aspect, the method 900 may further include recording (not shown), by the monitoring device 810 (e.g., low-energy short-range wireless network processor 324 or processor 302 in conjunction with memory hierarchy 308), information about the at least one relay node in response to the identifying, such as a make and model of the at least one relay node. The monitoring node may report this information to the user and/or the manufacturer with the identification of the at least one relay node. Recording such meta data about the at least one relay node can be helpful in identifying to the user or manufacturer which node it is in the wireless mesh network, and that such a node can act as an attacker node.

In an aspect, the method 900 may further include removing (not shown), by the monitoring device 810 (e.g., low-energy short-range wireless network processor 324 or processor 302), the at least one relay node from the wireless mesh network. In response to removing the at least one relay node, the method 900 may further include initiating (not shown), by the monitoring device 810 (e.g., low-energy short-range wireless network processor 324 or processor 302), a network encryption key refresh procedure for all remaining nodes in the wireless mesh network. The method 900 may also include instructing, by the monitoring device 810 (e.g., low-energy short-range wireless network processor 324 or processor 302), all remaining nodes in the wireless mesh network to flush their local source and sequence number cache. Removing the at least one relay node from the wireless mesh network, initiating a network encryption key refresh procedure, and flushing local caches is beneficial to restore the wireless mesh network to proper operation.

In an aspect, the information from the first message may include an address of the source node, an address of the destination node, and a sequence number associated with the address of the source node. In that case, the monitoring device 810 may determine that the first message has been corrupted based on the address of the destination node, the sequence number, or both, being changed as the first message is transmitted in the wireless mesh network. In an aspect, the method 900 may further include identifying (not shown), by the monitoring device 810 (e.g., low-energy short-range wireless network processor 324 or processor 302), the at least one relay node as the security threat in the wireless mesh network based on a determination that the at least one relay node changed the address of the destination node, the sequence number, or both. Examining the address of the destination node and/or the sequence number can be beneficial because corrupting these fields is a relatively simple and effective (and therefore likely) way to corrupt messages in a mesh network.

In an aspect, the information from the first message may include a TTL field that is decremented by each relay node that relays the first message as it is transmitted in the wireless mesh network. In that case, the monitoring device 810 may determine that the first message has been corrupted based on the TTL field being changed to 0 before it reached the destination node or to a value greater than a threshold indicative of a corrupted TTL field. In an aspect, the method 900 may further include identifying (not shown), by the monitoring device 810 (e.g., low-energy short-range wireless network processor 324 or processor 302), the at least one relay node as the security threat in the wireless mesh network based on a determination that the at least one relay node changed the TTL field to 0 before it reached the destination node or to the value greater than the threshold indicative of a corrupted TTL field. Examining the TTL field can be beneficial because corrupting the TTL field is a relatively simple and effective (and therefore likely) way to corrupt messages in a mesh network.

In an aspect, the determining at 906 may include uploading, by the monitoring device 810 (e.g., low-energy short-range wireless network processor 324 or processor 302 in conjunction with the communication device 320), the information from the first message to a remote server, wherein the remote server performs the analysis of the information from the first message, and receiving, at the monitoring device 810, a notification from the remote server that the first message has been corrupted. This may be beneficial where the monitoring device 810 is a low-power or battery operated device, and therefore lacks the processing capability to sufficiently analyze all traffic in the network.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for establishing an encrypted connection between a first node and a second node in a wireless mesh network.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for detecting a security threat in a wireless mesh network, comprising:
   detecting, by a monitoring device in the wireless mesh network, a first message transmitted by a source node in the wireless mesh network to a destination node in the wireless mesh network via at least one relay node in the wireless mesh network and the monitoring device is separate from the destination node,
   wherein the monitoring device sniffs messages as they are being transmitted between the source node and destination mode in the wireless mesh network;
   collecting, by the monitoring device, information from the first message as it is transmitted in the wireless mesh network by directly collecting the information while listening to the first message as it is transmitted from the source node to the destination node over the wireless mesh network;
   determining, by the monitoring device, that the first message has been corrupted based on analysis of the information from the first message; and
   detecting, by the monitoring device, the security threat in the wireless mesh network based on the first message being corrupted.

2. The method of claim 1, wherein the detecting the security threat comprises:
   identifying, by the monitoring device, the at least one relay node as the security threat in the wireless mesh network based on a determination that the first message has been corrupted by the at least one relay node.

3. The method of claim 2, further comprising:
   notifying, by the monitoring device, a user of the wireless mesh network that the at least one relay node is the security threat.

4. The method of claim 2, further comprising:
   notifying, by the monitoring device, a manufacturer of the at least one relay node that the at least one relay node is the security threat.

5. The method of claim 2, further comprising:
   recording, by the monitoring device, information about the at least one relay node in response to the identifying.

6. The method of claim 5, wherein the information comprises a make and model of the at least one relay node.

7. The method of claim 2, further comprising:
removing, by the monitoring device, the at least one relay node from the wireless mesh network.

8. The method of claim 7, further comprising:
initiating, by the monitoring device, a network key refresh procedure for all remaining nodes in the wireless mesh network.

9. The method of claim 7, further comprising:
instructing, by the monitoring device, all remaining nodes in the wireless mesh network to flush their local source and sequence number cache.

10. The method of claim 1, wherein the information from the first message comprises an address of the source node, an address of the destination node, and a sequence number associated with the address of the source node.

11. The method of claim 10, wherein the monitoring device determines that the first message has been corrupted based on the address of the destination node, the sequence number, or both, being changed as the first message is transmitted in the wireless mesh network.

12. The method of claim 11, further comprising:
identifying, by the monitoring device, the at least one relay node as the security threat in the wireless mesh network based on a determination that the at least one relay node changed the address of the destination node, the sequence number, or both.

13. The method of claim 1, wherein the information from the first message comprises a time-to-live (TTL) field that is decremented by each relay node that relays the first message as it is transmitted in the wireless mesh network.

14. The method of claim 13, wherein the monitoring device determines that the first message has been corrupted based on the TTL field being changed to 0 before it reached the destination node or to a value greater than a threshold indicative of a corrupted TTL field.

15. The method of claim 14, further comprising:
identifying, by the monitoring device, the at least one relay node as the security threat in the wireless mesh network based on a determination that the at least one relay node changed the TTL field to 0 before it reached the destination node or to the value greater than the threshold indicative of a corrupted TTL field.

16. The method of claim 1, wherein the determining comprises:
uploading, by the monitoring device, the information from the first message to a remote server, wherein the remote server performs the analysis of the information from the first message; and
receiving, at the monitoring device, a notification from the remote server that the first message has been corrupted.

17. The method of claim 1, wherein the monitoring device is a provisioner node in the wireless mesh network.

18. The method of claim 1, wherein the monitoring device is not a provisioner node or controller node in the wireless mesh network.

19. The method of claim 1, wherein the monitoring device is a stationary mains-powered device in the wireless mesh network.

20. The method of claim 1, wherein the monitoring device is a battery-powered mobile device in the wireless mesh network.

21. The method of claim 1, wherein the wireless mesh network comprises a Bluetooth® mesh network.

22. An apparatus for detecting a security threat in a wireless mesh network, comprising:
at least one hardware processor of a monitoring device in the wireless mesh network configured to:
detect a first message transmitted by a source node in the wireless mesh network to a destination node in the wireless mesh network via at least one relay node in the wireless mesh network and the monitoring device is separate from the destination node,
wherein the monitoring device sniffs messages as they are being transmitted between the source node and destination mode in the wireless mesh network;
collect information from the first message as it is transmitted in the wireless mesh network by directly collecting the information while listening to the first message as it is transmitted from the source node to the destination node over the wireless mesh network;
determine that the first message has been corrupted based on analysis of the information from the first message; and
detect the security threat in the wireless mesh network based on the first message being corrupted.

23. The apparatus of claim 22, wherein the at least one processor being configured to detect the security threat comprises the at least one processor being configured to:
identify the at least one relay node as the security threat in the wireless mesh network based on a determination that the first message has been corrupted by the at least one relay node.

24. The apparatus of claim 23, wherein the at least one processor is further configured to:
notify a user of the wireless mesh network that the at least one relay node is the security threat.

25. The apparatus of claim 23, wherein the at least one processor is further configured to:
notify a manufacturer of the at least one relay node that the at least one relay node is the security threat.

26. The apparatus of claim 23, wherein the at least one processor is further configured to:
record information about the at least one relay node in response to the identifying.

27. The apparatus of claim 26, wherein the information comprises a make and model of the at least one relay node.

28. The apparatus of claim 23, wherein the at least one processor is further configured to:
remove the at least one relay node from the wireless mesh network.

29. The apparatus of claim 28, wherein the at least one processor is further configured to:
initiate a network key refresh procedure for all remaining nodes in the wireless mesh network.

30. The apparatus of claim 28, wherein the at least one processor is further configured to:
instruct all remaining nodes in the wireless mesh network to flush their local source and sequence number cache.

31. The apparatus of claim 22, wherein the information from the first message comprises an address of the source node, an address of the destination node, and a sequence number associated with the address of the source node.

32. The apparatus of claim 31, wherein the monitoring device determines that the first message has been corrupted based on the address of the destination node, the sequence number, or both, being changed as the first message is transmitted in the wireless mesh network.

33. The apparatus of claim 32, wherein the at least one processor is further configured to:
identify the at least one relay node as the security threat in the wireless mesh network based on a determination that the at least one relay node changed the address of the destination node, the sequence number, or both.

34. The apparatus of claim 22, wherein the information from the first message comprises a time-to-live (TTL) field that is decremented by each relay node that relays the first message as it is transmitted in the wireless mesh network.

35. The apparatus of claim 34, wherein the monitoring device determines that the first message has been corrupted based on the TTL field being changed to 0 before it reached the destination node or to a value greater than a threshold indicative of a corrupted TTL field.

36. The apparatus of claim 35, wherein the at least one processor is further configured to:
identify the at least one relay node as the security threat in the wireless mesh network based on a determination that the at least one relay node changed the TTL field to 0 before it reached the destination node or to the value greater than the threshold indicative of a corrupted TTL field.

37. The apparatus of claim 22, wherein the at least one processor being configured to determine comprises the at least one processor being configured to:
upload the information from the first message to a remote server, wherein the remote server performs the analysis of the information from the first message; and
receive a notification from the remote server that the first message has been corrupted.

38. The apparatus of claim 22, wherein the monitoring device is a provisioner node in the wireless mesh network.

39. The apparatus of claim 22, wherein the monitoring device is not a provisioner node or controller node in the wireless mesh network.

40. The apparatus of claim 22, wherein the monitoring device is a stationary mains-powered device in the wireless mesh network.

41. The apparatus of claim 22, wherein the monitoring device is a battery-powered mobile device in the wireless mesh network.

42. The apparatus of claim 22, wherein the wireless mesh network comprises a Bluetooth® mesh network.

43. A non-transitory computer-readable medium storing computer executable instructions when executed by a hardware processor for detecting a security threat in a wireless mesh network, the computer-executable instructions comprising:
at least one instruction instructing a monitoring device in the wireless mesh network to detect a first message transmitted by a source node in the wireless mesh network to a destination node in the wireless mesh network via at least one relay node in the wireless mesh network and the monitoring device is separate from the destination node,
wherein the monitoring device sniffs messages as they are being transmitted between the source node and destination mode in the wireless mesh network;
at least one instruction instructing the monitoring device to collect information from the first message as it is transmitted in the wireless mesh network by directly collecting the information while listening to the first message as it is transmitted from the source node to the destination node over the wireless mesh network;
at least one instruction instructing the monitoring device to determine that the first message has been corrupted based on analysis of the information from the first message; and
at least one instruction instructing the monitoring device to detect the security threat in the wireless mesh network based on the first message being corrupted.

44. An apparatus for detecting a security threat in a wireless mesh network, comprising:
means for processing of a monitoring device in the wireless mesh network configured to:
detect a first message transmitted by a source node in the wireless mesh network to a destination node in the wireless mesh network via at least one relay node in the wireless mesh network and the monitoring device is separate from the destination device,
wherein the monitoring device sniffs messages as they are being transmitted between the source node and destination mode in the wireless mesh network;
collect information from the first message as it is transmitted in the wireless mesh network by directly collecting the information while listening to the first message as it is transmitted from the source device to the destination device over the wireless mesh network;
determine that the first message has been corrupted based on analysis of the information from the first message; and detect the security threat in the wireless mesh network based on the first message being corrupted.

\* \* \* \* \*